United States Patent
Salman et al.

(10) Patent No.: US 12,136,260 B2
(45) Date of Patent: Nov. 5, 2024

(54) ADAPTIVE LEARNING FOR SEMANTIC SEGMENTATION

(71) Applicant: Schlumberger Technology Corporation, Sugar Land, TX (US)

(72) Inventors: Nader Salman, Houston, TX (US); Matthias Cremieux, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/702,274

(22) PCT Filed: Oct. 27, 2022

(86) PCT No.: PCT/US2022/047968
§ 371 (c)(1),
(2) Date: Apr. 17, 2024

(87) PCT Pub. No.: WO2023/076438
PCT Pub. Date: May 4, 2023

(65) Prior Publication Data
US 2024/0331368 A1    Oct. 3, 2024

Related U.S. Application Data

(60) Provisional application No. 63/272,438, filed on Oct. 27, 2021.

(51) Int. Cl.
*G06V 10/778* (2022.01)
*G06N 3/09* (2023.01)
(Continued)

(52) U.S. Cl.
CPC ........... *G06V 10/7788* (2022.01); *G06N 3/09* (2023.01); *G06N 3/091* (2023.01); *G06V 10/267* (2022.01);
(Continued)

(58) Field of Classification Search
CPC ............. G06V 10/7788; G06V 10/267; G06V 10/763; G06V 10/774; G06V 20/70; G06N 3/09; G06N 3/091
See application file for complete search history.

(56) References Cited

U.S. PATENT DOCUMENTS 9,858,525 B2 * 1/2018 Dai ..................... G06F 18/2185
10,832,046 B1 11/2020 Al-Gharaibeh
(Continued)

FOREIGN PATENT DOCUMENTS

EP    3475881 A1    5/2019
WO    2021007514 A1    1/2021

OTHER PUBLICATIONS

Usmani, Usman Ahmad, et al. "A reinforced active learning algorithm for semantic segmentation in complex imaging." IEEE Access 9 (2021): 168415-168432. (Year: 2021).*
(Continued)

*Primary Examiner* — Bobbak Safaipour
(74) *Attorney, Agent, or Firm* — Jeffrey D. Frantz

(57) ABSTRACT

Techniques for semantic segmentation of images are presented. The techniques include obtaining a semantic segmentation model, the semantic segmentation model having been trained using a first subset of sliding windows and corresponding first ground truth masks for the first subset of sliding windows; ranking a plurality of sliding windows from a corpus of training images according to an uncertainty metric; selecting a next subset of sliding windows from the corpus of training images based on the ranking and based on a similarity metric for one or more characteristics of a sliding window relative to other sliding windows; providing a collaborative user interface; receiving ground truth masks for the next subset of sliding windows using the collaborative user interface; and retraining the semantic segmentation model using the next subset of sliding windows and the ground truth masks for the next subset of sliding windows.

20 Claims, 13 Drawing Sheets

(51) Int. Cl.
  *G06N 3/091* (2023.01)
  *G06V 10/26* (2022.01)
  *G06V 10/762* (2022.01)
  *G06V 10/774* (2022.01)
  *G06V 20/70* (2022.01)

(52) U.S. Cl.
  CPC .......... *G06V 10/763* (2022.01); *G06V 10/774* (2022.01); *G06V 20/70* (2022.01)

(56) References Cited

U.S. PATENT DOCUMENTS

| | | |
|---|---|---|
| 2014/0040169 A1 | 2/2014 | Forman |
| 2014/0229407 A1 | 8/2014 | White |
| 2016/0371601 A1 | 12/2016 | Grove |
| 2017/0262635 A1 | 9/2017 | Strauss |
| 2018/0240031 A1 | 8/2018 | Huszar |
| 2019/0019266 A1 | 1/2019 | Boyle |
| 2019/0065908 A1 | 2/2019 | Lee |
| 2019/0261566 A1 | 8/2019 | Robertson |
| 2019/0325275 A1 | 10/2019 | Lee |
| 2021/0295104 A1 | 9/2021 | Squires |
| 2021/0406644 A1 | 12/2021 | Salman |
| 2022/0136344 A1* | 5/2022 | Mora ................. H04N 7/183 175/48 |

OTHER PUBLICATIONS

Search Report and Written Opinion of International Patent Application No. PCT/US2022/047968; Dated Feb. 27, 2023; 6 pages.

* cited by examiner

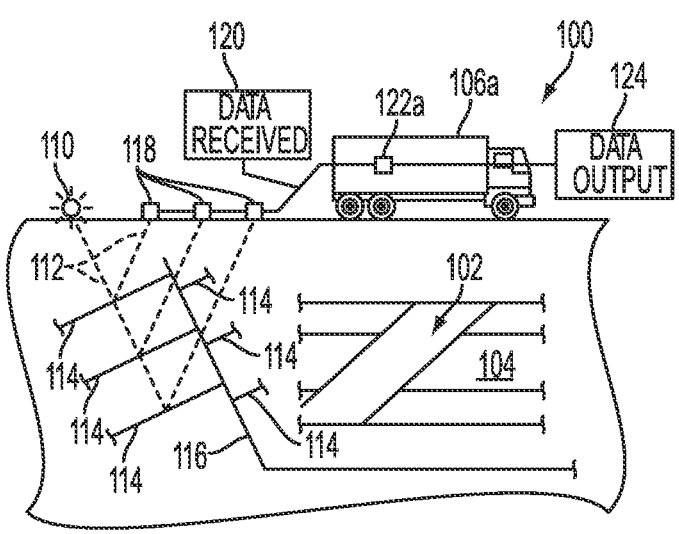
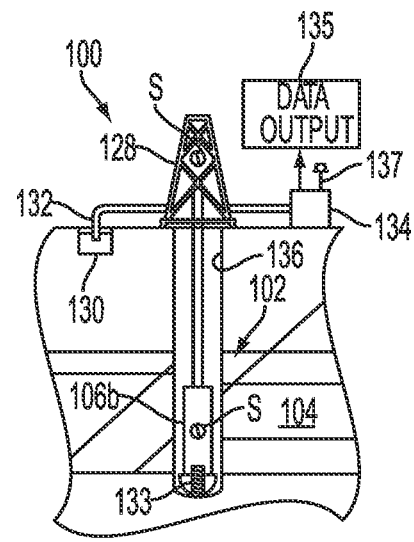
FIG. 1A
FIG. 1B
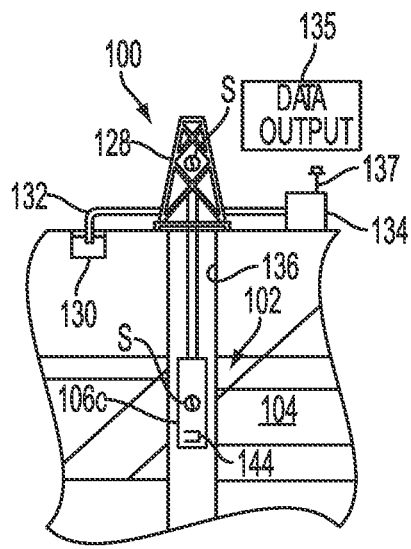
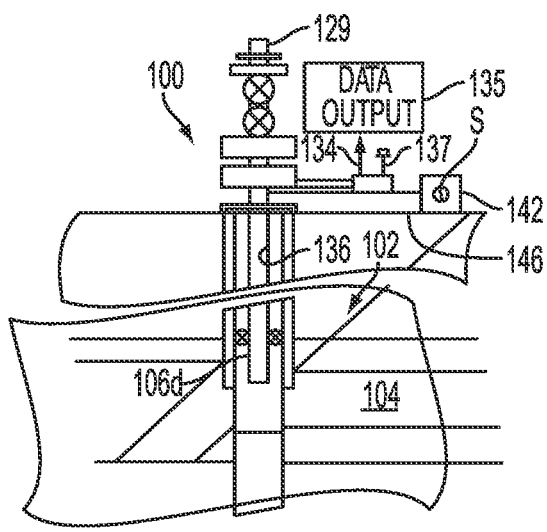
FIG. 1C
FIG. 1D

| CONFIGURE "THREE_MODES_SEGMENTATION" PYTHON SCRIPT | ✕ |
|---|---|
| ACQUISTION SIZE | 16 |
| NB EPOCHS | 10 |
| IMAGE SIZE | 512 |
| USERNAME | MCREMIET |
| LEARNING RATE | 0.001 |
| BATCH SIZE | 4 |
| GPUS | 0,1 ▽ |
| N PROCESSES | 5 |
| LABELERS | MCREMIEUX2 ▽ |
| STARTING IMAGES | 16 |
| METRIC | ENTROPY ▽ |
| SAMPLING MODE | SELECT ▽ |
| AGENT NUMBER | 1 ▽ |
| ASSISTED LABELING | ⊖ |

FIG. 9

ADAPTIVE LEARNING FOR SEMANTIC SEGMENTATION

RELATED APPLICATION

This application is a National Stage Entry of PCT/US2022/047968, filed Oct. 27, 2022, which claims the benefit of, and priority to, U.S. Provisional Patent Application No. 63/272,438, entitled, "Adaptive Learning for Semantic Segmentation," filed Oct. 27, 2021.

BACKGROUND

Machine learning automation of data inspection tasks (e.g., manufacturing asset imaging, satellite imagery, seismic imaging, medical imaging, etc.) using various imaging modalities (RGB, Infrared, Multi-Spectral . . . ) and employing precise pixel level labeling typically includes a bottleneck at the labeling stage. In the inspection domain, large amounts of data may be generated, but most of the data is not readily used for machine learning purposes. That is, the data is unlabeled, and labeling the data generally calls for human subject matter experts to label the high-resolution images at a per pixel level. Various techniques have been used to increase the efficiency of this task (e.g., water shedding), but it remains a time-intensive activity that increases the costs for such automation projects.

SUMMARY

According to various embodiments, computer-implemented method of adaptive learning for semantic segmentation of images is presented. The method includes: obtaining a semantic segmentation model, the semantic segmentation model having been trained using a first subset of sliding windows and corresponding first ground truth masks for the first subset of sliding windows; ranking a plurality of sliding windows from a corpus of training images according to an uncertainty metric; selecting a next subset of sliding windows from the corpus of training images based on the ranking and based on a similarity metric for one or more characteristics of a sliding window relative to other sliding windows; providing a collaborative user interface for labeling the next subset of sliding windows; receiving ground truth masks for the next subset of sliding windows using the collaborative user interface; and retraining the semantic segmentation model using the next subset of sliding windows and the ground truth masks for the next subset of sliding windows.

Various optional features of the above embodiments include the following. The corpus of images may represent a cutter of a drill bit. The method may include determining an integrity of a cutter of a drill bit using the semantic segmentation model. The method may include repeating the ranking, the selecting, the providing, the receiving, and the retraining a plurality of times. The obtaining the semantic segmentation model may include training the semantic segmentation model using the first subset of sliding windows and the corresponding first ground truth masks for the first subset of sliding windows. The collaborative user interface for labeling the next subset of sliding windows may display a respective sliding window from the next subset of sliding windows in a context of a full training image from the corpus of training images. The collaborative user interface for labeling the next subset of sliding windows may display a respective sliding window from the next subset of sliding windows highlighted within a full training image from the corpus of training images. The collaborative user interface for labeling the next subset of sliding windows may display a respective heatmap generated by the semantic segmentation model over a respective sliding window from the next subset of sliding windows. The uncertainty metric may include an entropy metric. The selecting the next subset of sliding windows may include: grouping the plurality of sliding windows based on the similarity metric into a plurality of clusters; and selecting highest ranked sliding windows from each of the plurality of clusters.

According to various embodiments, a system for adaptive learning for semantic segmentation of images is presented. The system includes an electronic processor and a non-transitory computer readable medium including instructions that, when executed by the electronic processor, configure the electronic processor to perform actions including: obtaining a semantic segmentation model, the semantic segmentation model having been trained using a first subset of sliding windows and corresponding first ground truth masks for the first subset of sliding windows; ranking a plurality of sliding windows from a corpus of training images according to an uncertainty metric; selecting a next subset of sliding windows from the corpus of training images based on the ranking and based on a similarity metric for one or more characteristics of a sliding window relative to other sliding windows; providing a collaborative user interface for labeling the next subset of sliding windows; receiving ground truth masks for the next subset of sliding windows using the collaborative user interface; and retraining the semantic segmentation model using the next subset of sliding windows and the ground truth masks for the next subset of sliding windows.

Various optional features of the above embodiments include the following. The corpus of images may represent a cutter of a drill bit. The actions may further include determining an integrity of a cutter of a drill bit using the semantic segmentation model. The actions may further include repeating the ranking, the selecting, the providing, the receiving, and the retraining a plurality of times. The obtaining the semantic segmentation model may include training the semantic segmentation model using the first subset of sliding windows and the corresponding first ground truth masks for the first subset of sliding windows. The collaborative user interface for labeling the next subset of sliding windows may display a respective sliding window from the next subset of sliding windows in a context of a full training image from the corpus of training images. The collaborative user interface for labeling the next subset of sliding windows may display a respective sliding window from the next subset of sliding windows highlighted within a full training image from the corpus of training images. The collaborative user interface for labeling the next subset of sliding windows may display a respective heatmap generated by the semantic segmentation model over a respective sliding window from the next subset of sliding windows. The uncertainty metric may include an entropy metric. The selecting the next subset of sliding windows may include: grouping the plurality of sliding windows based on the similarity metric into a plurality of clusters; and selecting highest ranked sliding windows from each of the plurality of clusters.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 9 illustrates a view of a graphical user interface, according to an embodiment.

DESCRIPTION OF EMBODIMENTS

Figure 2:
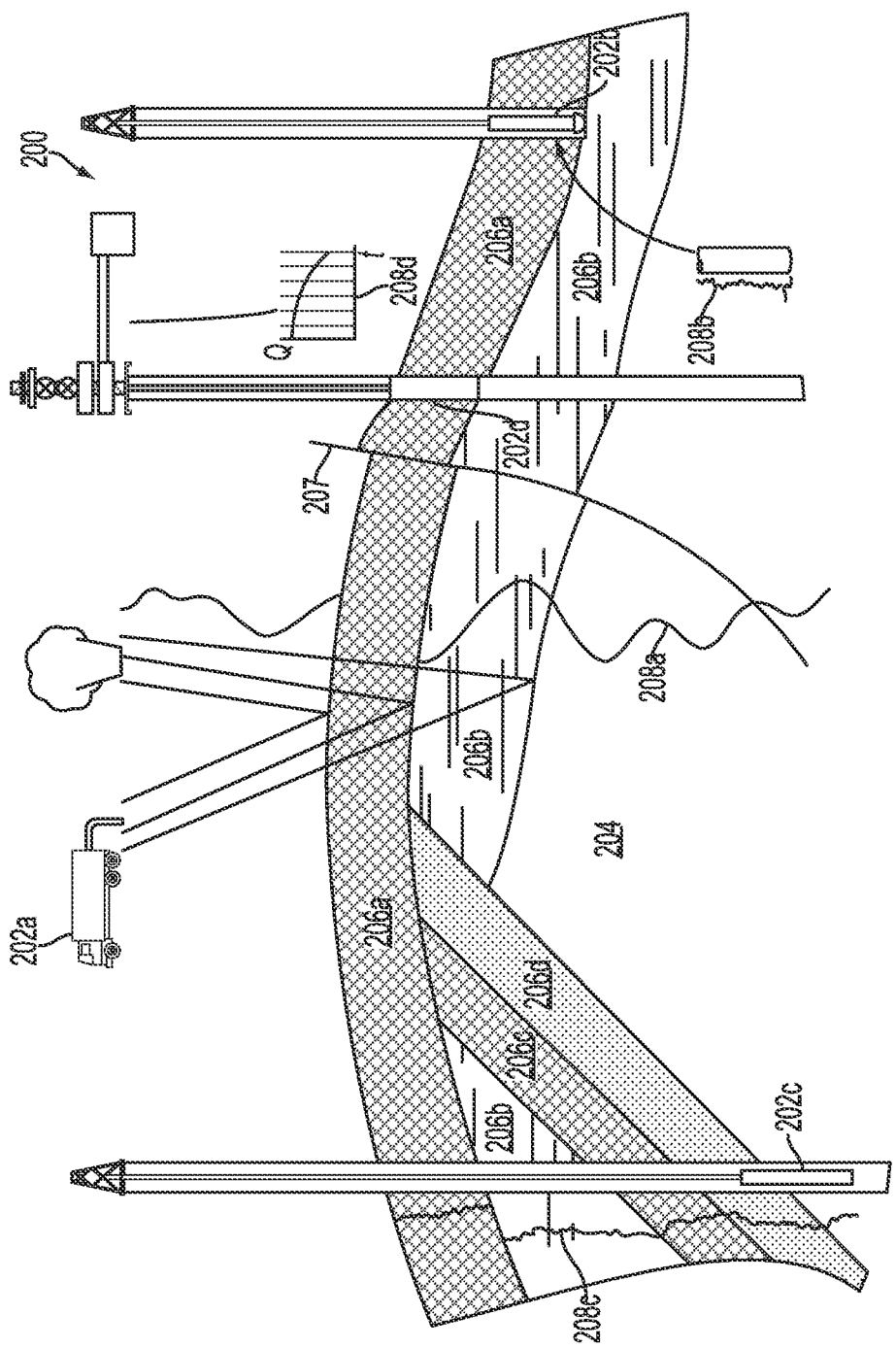

Some embodiments may provide an end-to-end multi-user collaborative active learning framework that facilitates pool-based active learning on high-resolution images (e.g., 4K+), for the task of semantic segmentation. The active learning strategy may not be based on entire images, but on sampled crops, e.g., of a fixed size, of the images, for example sliding windows, which may or may not overlap. Different sampling methods are described, each being adapted to a different use case and a different labeling budget. Embodiments may include an intuitive labeling approach, including online collaborative labeling of image crops, where image crops are shown in the context of their constituent image for guidance, but where only the image crops are labeled. Coupled with deep learning methods, this method may achieve high performance results on semantic segmentation tasks while maintaining low labeling budget and time requirements.

As an illustrative use case, visual inspection of Polycrystalline Diamond Compact (PDC) cutters may utilize high-resolution images (e.g., RGB/Infrared/Multispectral). The individual images may then be split into cropped parts, e.g., of fixed size. Machine learning semantic segmentation, trained using an embodiment, may be used to automate the visual inspection process. Since many parts of the images look alike, by sampling parts of the images, the amount of data to be presented for labeling may be reduced.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques, and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b, which may include a PDC cutter, suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors(S), such as gauges, may be positioned about oilfield 100 to collect data relating to various oilfield operations as described previously. As shown, sensor(S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors(S) may also be positioned in one or more locations in the circulating system.

Drilling tools 106b may include a bottom hole assembly (BHA) (not shown), generally referenced, near the drill bit (e.g., within several drill collar lengths from the drill bit). The drill bit may include a PDC cutter. The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors(S) may be collected by surface unit 134 and/or other data collection sources for analysis or other processing. The data collected by sensors(S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to inspect any portion of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors(S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors(S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
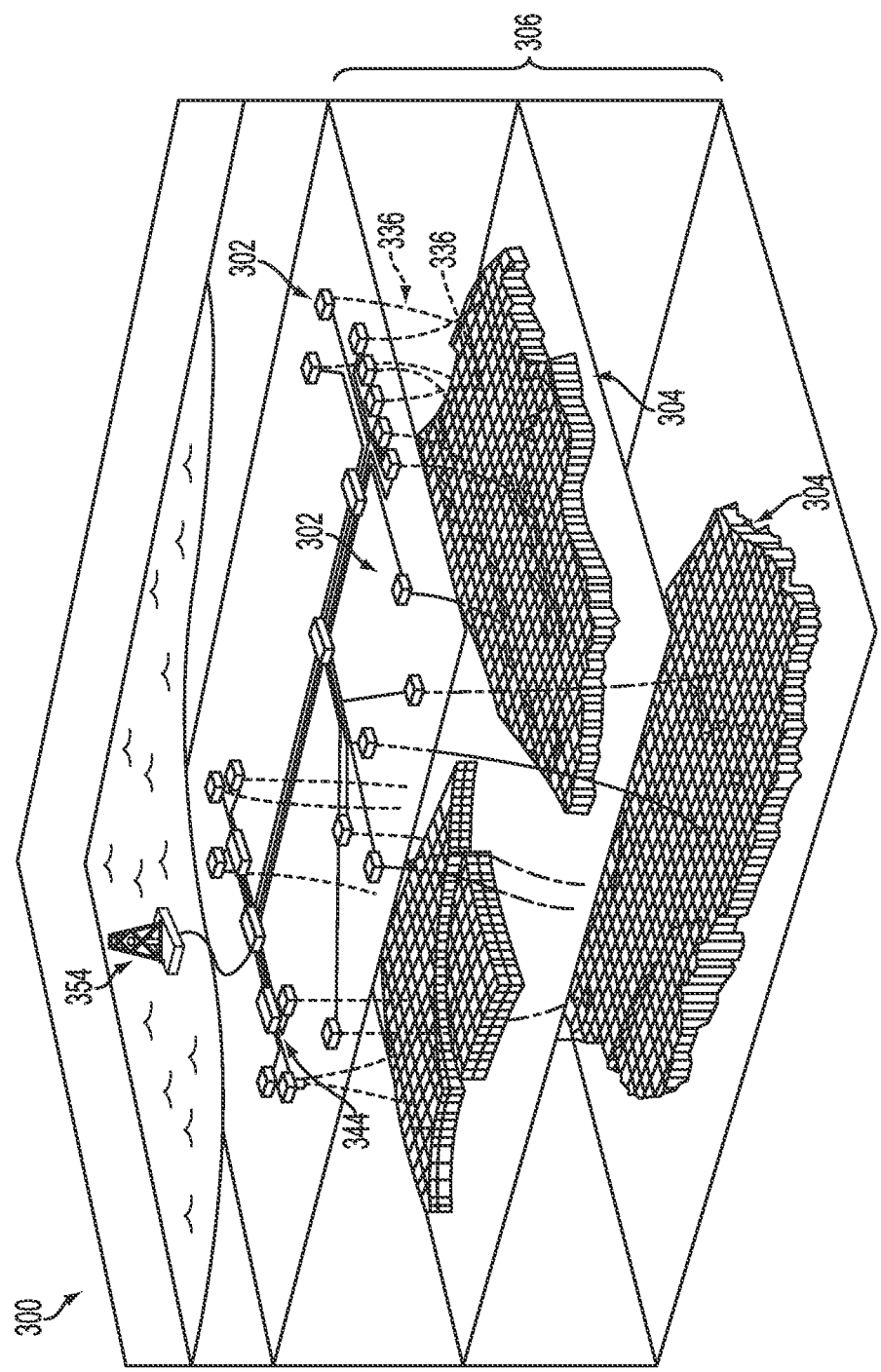

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
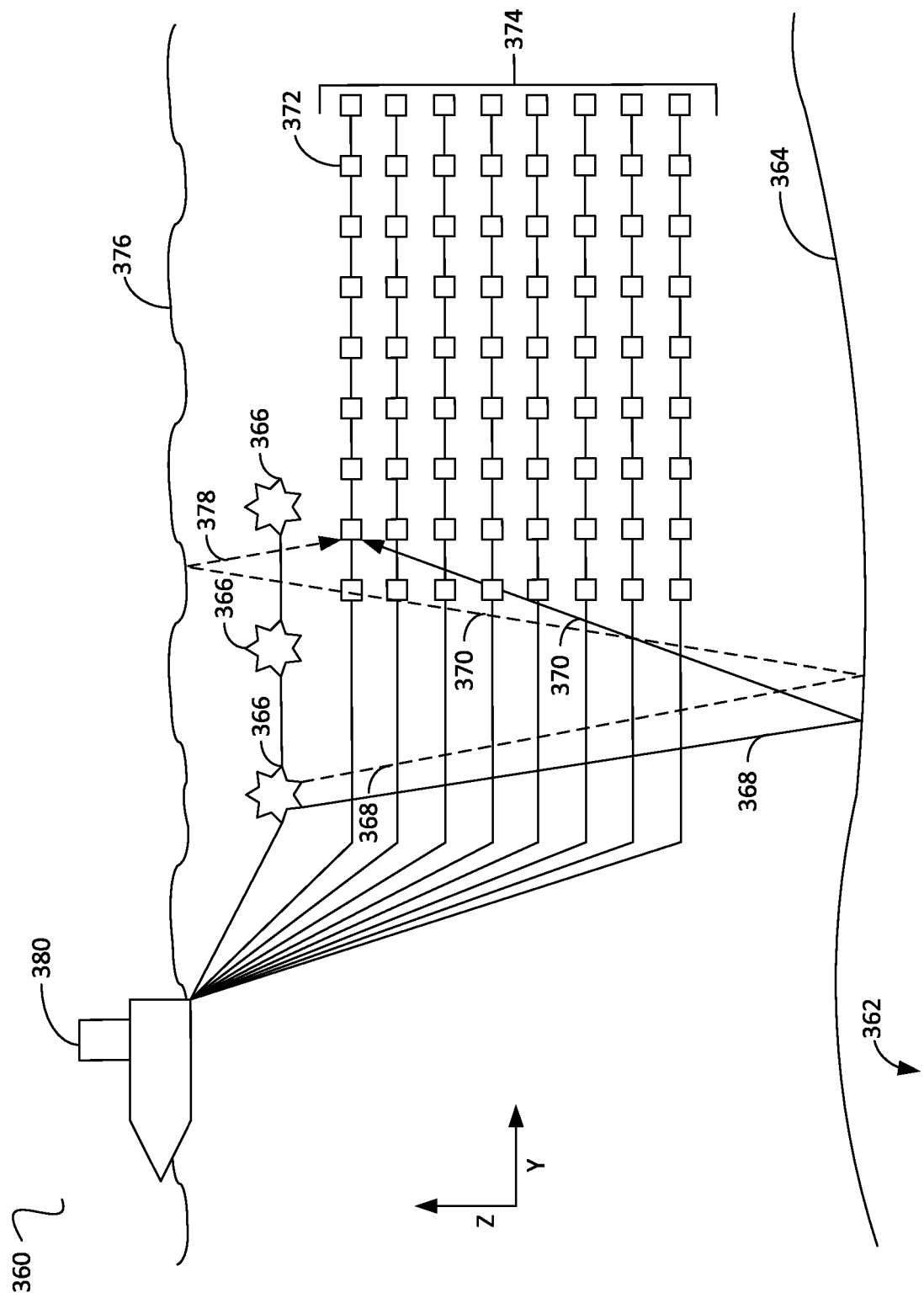

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362. Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

In general, embodiments may be used for automated semantic segmentation of any aspect of the field configurations shown and described herein in reference to FIGS. 1A-1D, 2, 3A, and 3B. By way of non-limiting example, embodiments may be used for semantic segmentation of any images acquired by or derived from any of the sensors disclosed herein, by way of non-limiting examples, seismic survey images or core samples images. As another example, embodiments may be used for semantic segmentation as part of an inspection process for any tool or feature disclosed herein. As a specific example, embodiments may be used for semantic segmentation to automate a pre-deployment inspection task of a PDC cutter, by way of non-limiting example.

In general, embodiments may provide an end-to-end, active learning system and method for semantic segmentation of high resolution images, e.g., in a way that is agnostic to the data provided initially (e.g., manufacturing asset imaging, satellite imagery, seismic imaging, medical imaging, etc.). Active learning sampling may be coupled with a labeling strategy that highlights a sliding window in the full images to the user, so that the labeling can be done using the full image as a context of the sliding window. This may render the labeling more precise while reducing overall labeling time. Embodiments of the system and method are discussed herein with reference to inspection of PDC cutters; however, it will be appreciated that this is merely one potential use. The system and method could be employed with any other inspection task, for example, or for any semantic segmentation task in general.

Inspecting PDC cutters for integrity manually can be tedious and time-consuming, and may be prone to false negatives (cutters incorrectly passing the inspection). Currently, to detect flaws on a cutter, inspectors may use a microscope that zooms 40× on the cutter and review the cutter by hand. Against the backdrop of potentially many (e.g., hundreds of thousands, or more) such parts produced for industrial applications, even 1-2% of defects missed at the initial final inspection can amount to substantial processing costs post inspection for defective parts. On the other hand, the cost of the inspectors' wages directly increases the cost per part.

Therefore, for this specific use case, the practical application of the present systems and methods may reduce defect escape rates by improving sensor capabilities and improving inspection decision consistency. The present systems and methods may also reduce scrap costs by preventing non-value adding operations by earlier defect detection, by improving production rates through better data analytics capability, and by reducing scrapping good parts. The present systems and methods may also improve inspection efficiency by automating inspection decisions and automating part handling. The present systems and methods may also improve the traceability by automating image and decision capture.

Embodiments may be used in the context of two successive deep learning tasks for automated manufactured part inspection: semantic segmentation and object detection. Semantic segmentation may be used to pinpoint a region of interest (e.g., the diamond band on a PDC cutter). Subsequently, object detection may be used to identify any defects. Examples of suitable object detection techniques are shown and disclosed in PCT/US2020/041597 (WO2021/007514) and PCT/US2019/052642 (WO2020/068784).

Figure 4:
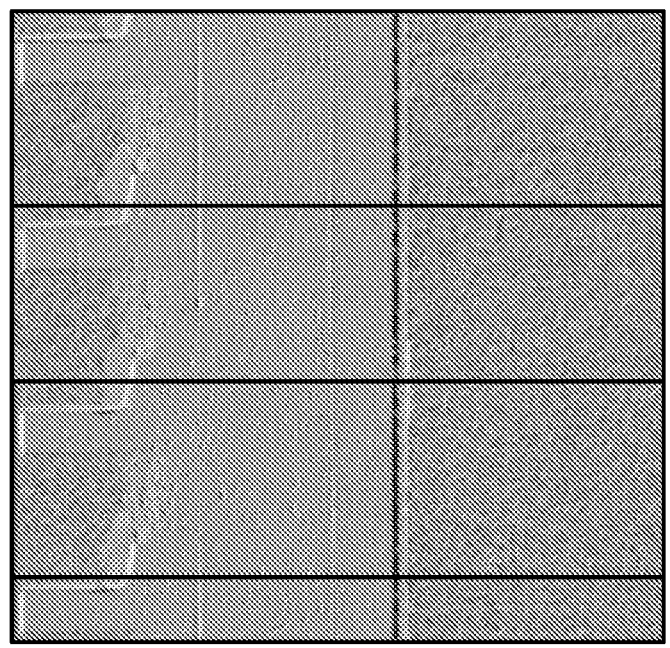
FIG. 4 illustrates an example of an image of a set of cutters, according to an embodiment.

FIG. 4 illustrates an example of an image of a set of cutters, according to an embodiment. Looking closely at the cutters, it can be seen that while several families of cutters can be identified, the images of the cutters may have several elements in common, and may present an intrinsically redundant, that is, internally self-similar, structure. This may imply that many (e.g., most) of the cutter images are roughly the same, and therefore that, should a deep learning algorithm be trained on the dataset, it might have a high chance of performing well with a small subset of the data labeled.

Figure 5A:
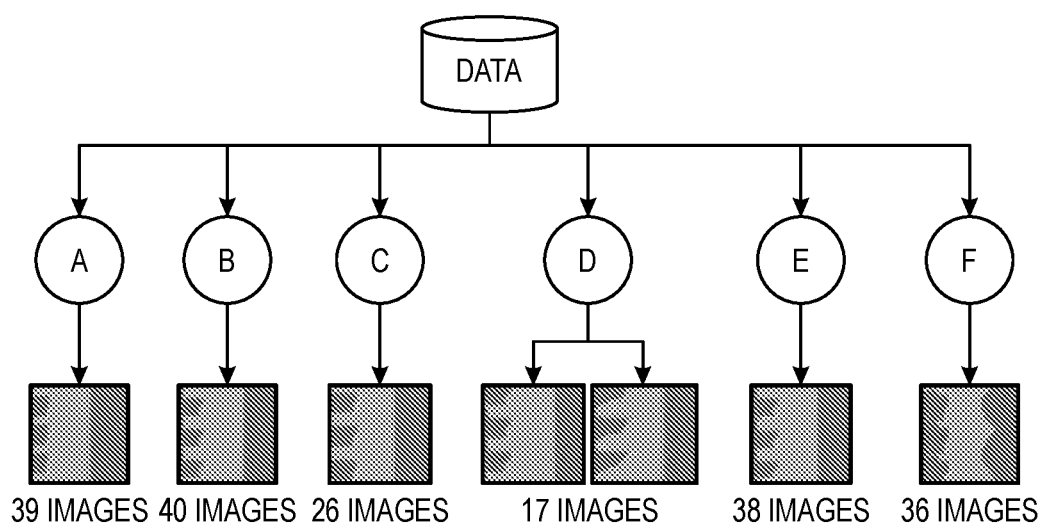
FIGS. 5A and 5B illustrate diagrammatic views of an image segmentation and labeling process, according to an embodiment.

Referring now to FIG. 5A, a dataset according to a reduction to practice is shown to have several (e.g., six) different subsets of images (each between 17 and 40 images) A, B, C, D, E, F. Subsets A, B, C, E and the first half of D have images that are similar to the naked eye, while the second half of D and F are cutters with a completely different shape. In general, as here, the images may be 4096×4096 pixels, which may result in operations using these images being resource-consuming and computationally intensive. Further, given the similarity, many or even most of the predictions may not be accurate or otherwise useful, but the labeling may take potentially several hours.

Figure 5B:
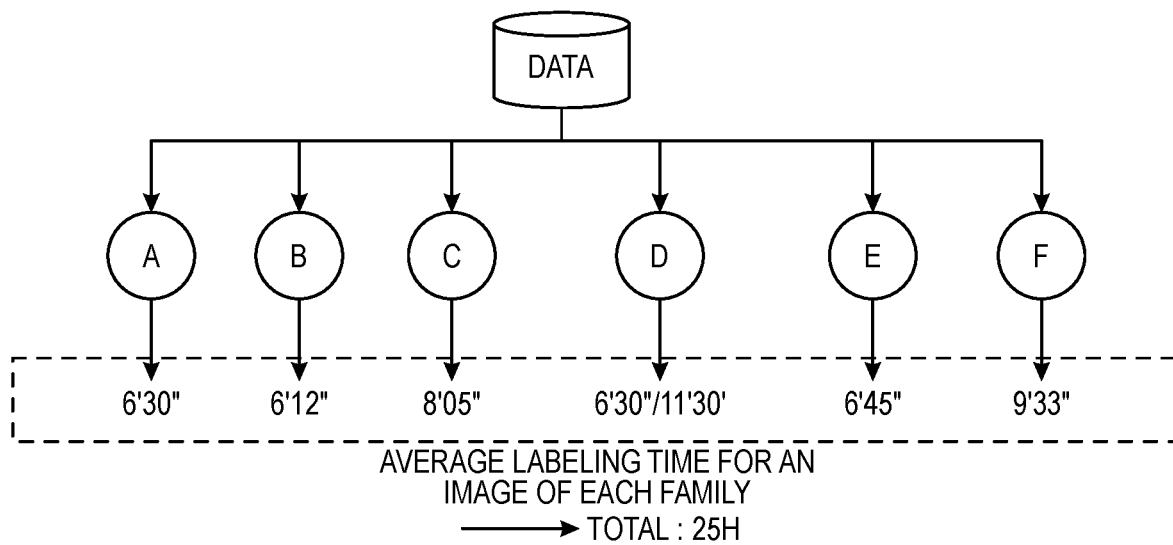

Referring to FIG. 5B, the images may be labeled one by one, in order to be able to train a model on the whole dataset as a benchmark. However, labeling images in the context of semantic segmentation is different than in the context of object detection. For object detection, only a small portion of pixels may be labeled. By contrast, for semantic segmentation, for known approaches, all the pixels of the image may be labeled, as the algorithm predicts the class of each one of these pixels. Therefore, labeling a single image for semantic segmentation is time-consuming, and the set of 196 images took, in the context of the reduction to practice, 25 hours to label each pixel. Embodiments may significantly reduce the labeling time for training machine learning semantic segmentation models by identifying only a small subset of sliding images that are to be labeled.

Embodiments may be adapted for high-resolution images by configuring the underlying neural network architecture and input training sliding window sizes, so that the active learning process fits in memory and does not cause out of memory errors. A strategy may be selected to allow the algorithm to perform efficiently while preserving image quality. A known strategy is a resizing or downscaling of the images to a format such that the system (including the underlying neural network architecture) is capable of handling entire downsized images based on the physical amount of onboard memory. The segmentation problem may be useful for providing a region of interest, which does not have to be pixel perfect. Hence, downscaling the picture of a certain factor may be acceptable. Furthermore, training models on downscaled images may still provide correct predictions and the Region of Interest (ROI) can be used. However, in some cases, adaptive learning of segmentation may be affected by the downscaling. Accordingly, some embodiments adopt a different strategy, that of sliding windows.

Some embodiments use a sliding window approach. This approach relies on successively cropping an image in a way that may allow the set of cropped images to describe the parts of the whole image. According to some embodiments, overlap between the crops of the images may be used to artificially augment the number of images in the dataset. For the reduction to practice, each 4k image yielded 16 sliding windows of size 1024×1024, amounting to roughly 4500 images in total.

Considerations on the Choice of Using Sliding Windows in the Algorithm

Active learning algorithms are generally used with full images, both for training and sampling. In the present embodiments, however, the images may have a very high resolution, which leads to sliding windows with a size comparable to that of images commonly analyzed. Furthermore, the dataset of images of the cutters may be repetitive (self-redundant), which means that if the model performs poorly on one image, it may be because there is a pattern in the image that the model has trouble predicting. Therefore, more information may be gained by sampling only certain sliding windows of an image (e.g., those that are not similar to other image portions as measured using an uncertainty metric, for example), rather than sampling each sliding window of an image, which would mean spending more budget on parts of an image where the model already performs well, and converging more slowly to a solution.

Thus, for the reduction to practice, several modes of sampling were compared to see if results match expectations.

Full image configuration: For this sampling mode, first, the algorithm computes a metric on all the sliding windows of an image, sums the values of the metric for the sliding windows, then sorts the full images by descending order of the metric value, and then samples the full images with the highest values. Once those images have been selected, the algorithm selects the sliding windows of the pre-selected full images, and acts as if the algorithm was selecting full images instead of just sliding windows.

Highest selected sliding windows configuration: In this sampling mode, the algorithm computes a metric for each individual sliding window, but instead of summing up the metrics for the sliding windows corresponding to a given image, it ranks the sliding windows by descending order, and selects the ones associated with the highest uncertainty. Thus, according to the highest selected sliding windows sampling mode configuration, all sliding windows are individually ranked, regardless as to which image they originate from.

Bag of sliding windows configuration: This sampling mode was tested to determine whether it was a more budget-efficient mode of sampling. In this sampling mode, the two approaches above may be mixed, by computing the metric on each of the sliding windows, and sorting the full images by descending order, but instead of selecting all the sliding windows of a given image, the algorithm may only select a few of them, the ones where the network is the most uncertain. This may allow the labeler to label a few of the sliding windows rather than the whole images, saving time and budget.

The results of the comparisons of the above sampling modes are presented below in reference to FIGS. 10, 11, 12, 13, and 14. First, however, a discussion of suitable metrics is presented.

Metrics

According to some embodiments, an entropy metric may be used with the chosen sampling mode. However, for other embodiments, e.g., embodiments in which the dataset is extremely redundant, use of an entropy metric may have detrimental effects on the sampling, as shown and described in reference to FIG. 6.

Figure 6:
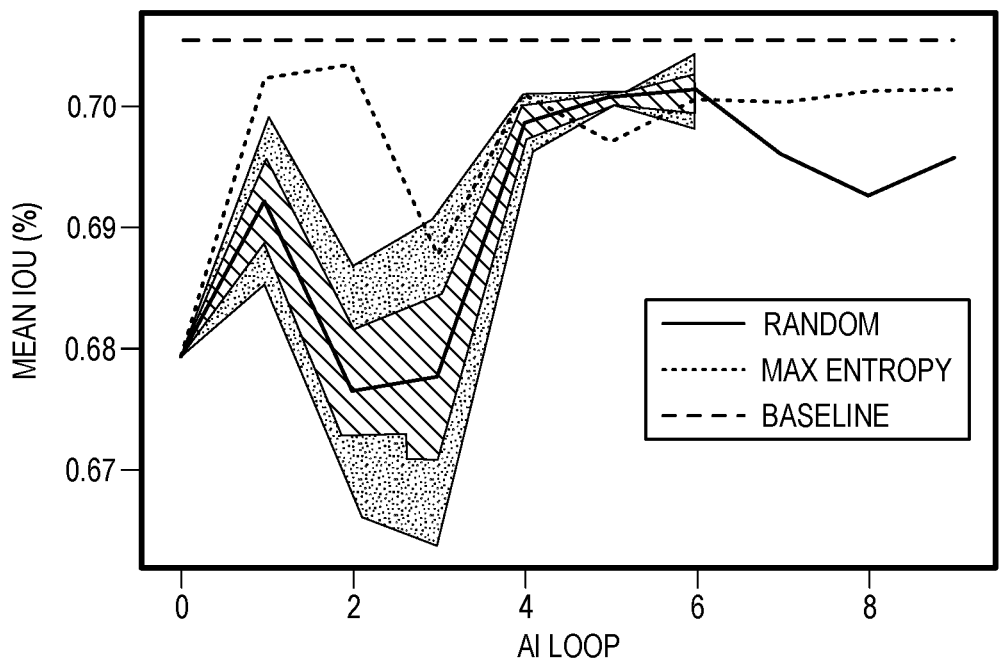
FIG. 6 illustrates a performance comparison for sampling using an entropy metric versus random sampling.

FIG. 6 illustrates a performance comparison for sampling using an entropy metric versus random sampling. In particular, the data in FIG. 6 represents using the highest selected sliding windows sampling configuration in conjunction with an entropy metric versus random sampling. When using the entropy metric however, because the model is likely to perform badly on a certain type of sliding window corresponding to the pattern badly recognized in the full image, the algorithm's response will be to sample images where the entropy is relatively high and thus sample similar images. But by doing so, the distribution of the training set shifts and becomes different from the one of the testing and validation set, as it now contains many similar images. This immediately results in a bad performance of the network on the next loop, which provides the user with saw-tooth like performance curves as shown in FIG. 6. This also explains why the random sampling would have similar if not better effects on the performance of the model, in this case, as shown in FIG. 6.

Thus, according to some embodiments, a similarity metric is used, which efficiently solves this problem. Such a similarity metric may keep the underlying distribution relatively the same among training iterations, hence the use of a similarity metric may ensure that the network does not select too much similar images. For example, sliding windows may be clustered based on the similarity metric, e.g., by grouping the sliding windows in a training corpus according to similarity metric values, such that similar sliding windows are grouped together. Then, training sliding windows may be selected from among the groups, e.g., by determining a centroid for each cluster and then for each centroid, selecting a number (e.g., a fixed and/or user-selected number) of training sliding windows that are ranked highest by a different metric, e.g., an uncertainty metric.

Non-limiting example similarity metrics are disclosed in PCT/US2020/041597 and PCT/US2019/052642. For example, the similarity metric can be cosine similarity. As another example, an embodiment may utilize a density metric that can be, for example, combined with a typicality metric. Rather than calculating similarities in the input space, some embodiments can operate to extract deep features from images with a convolutional neural network (CNN) pre-trained on a large visual database (e.g., consider ImageNet, etc.) and then compute density with a Gaussian kernel similarity function (e.g., rather than a cosine similarity function). A suitable density can be a mean similarity with other images. For example, similarity may be computed as: similarity(x,y)=exp $[-(\|x-y\|)^2/2\sigma^2]$, where x and y are feature vectors for the sliding windows and $\sigma$ is a scaling parameter.

Training Method

Figure 7:
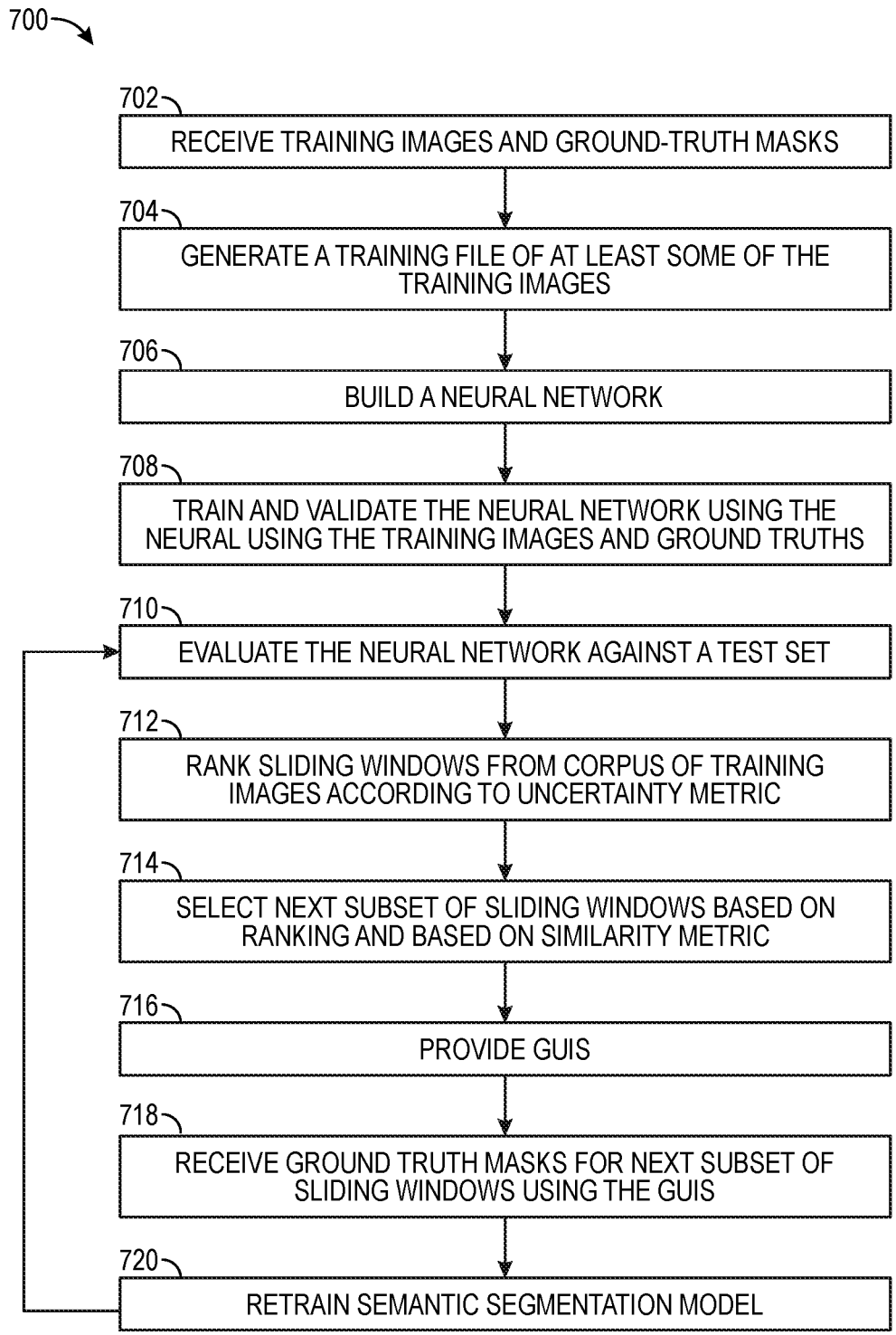
FIG. 7 illustrates a flowchart of a method, according to an embodiment.

FIG. 7 illustrates a flowchart of a method 700, in accordance with an embodiment of the present disclosure. The method may iteratively train a semantic segmentation model using active learning. The stop criteria (i.e., the criteria for which the framework should stop) may be that one or more goal metrics are reached (see 710, below), could be that a certain number of iteration loops have been reached, or could be that a certain labelling budget has been reached (as labelling costs money, thus a cutoff criterion may be tied to and amount of money and/or time).

The method may be initialized with a link to a data source that is unlabeled (e.g., streaming data source(s) or fixed data source(s)), a number of random input sliding windows to be selected at first iteration, an number of sliding windows to be selected at each iteration (can be fixed or dynamic), identification(s) of metric(s) to be used for sampling (e.g., an uncertainty, entropy, similarity, or any combination of these or others, etc.), identification(s) of goal metric(s) to be used to assess performance of active learning process at each step (e.g., IoU, mIoU, one precision/recall, etc.), and/or a stop criteria.

The method 700 may include, for example, four parts: data management (e.g., portions or all of blocks 702 and/or 704), training and testing (e.g., portions or all of blocks 704, 706, 708, 710, and/or 720), sampling and adaptive learning functions (e.g., portions or all of blocks 710, 712, 714, 716, and/or 718), and visualization and success assessment (e.g., subsequent to block 720).

Blocks 702, 704, 706, 708, and 710 are directed to obtaining a trained semantic segmentation model, where the semantic segmentation model is trained using an initial set of sliding windows and corresponding initial ground truth masks. According to some embodiments, the model may be obtained by training it using a subset of sliding windows from a training corpus of images, e.g., obtaining an untrained model and training it during a first training iteration. According to other embodiments, the model may be obtained from an outside source that trained the model, e.g., obtaining an a posteriori trained model such as a transfer learning model. Thus, the actions of blocks 702, 704, 706, 708, and 710 may be performed by a different entity than that which performs the actions of blocks 712, 714, 716, 718, and 720.

As at 702, training images and ground truth masks are obtained. The unlabeled images may be stored as three-channels RGB images, while the ground truth masks (labels for the images) may be stored separately as gray scale images. The sliding windows that may be used in some embodiments may be linked to the original images from which they are extracted, so as to facilitate building an intuitive GUI for the labelling process. The position of the sliding window may thus be integrated, relative to the original image, in the filename of the sliding window so that it can be easily parsed later.

In particular, the method 700 may include obtaining, e.g., generating, a training file of at least some of the training images, as at 704. An initial training set of sliding windows may be selected randomly. A user may select how many images and/or sliding to start training with, and the framework may then create a file containing the paths to the training images. This file may serve at least three purposes: first, at later stages, it provides the selected images to the population of labelers in the context of the image the sliding windows came from, second it may not store the training images in memory, thereby avoiding overflowing the memory, and third, it may allow the user to save the starting point, acting as a checkpoint. Later, when ground truth masks are received at 718, paths to the masks may be stored in the training file.

The method 700 may also include building the neural network to process and augment the images, as at 706. The method 700 may build structures for the neural network to feed on and augment the images (e.g., random flipping and mirroring) and include image preprocessing according to the chosen backbone for the model.

The method 700 may then train and validate the neural network, as at 708. The method 700 may train the neural network, e.g., for a number of epochs specified by the user, using the initial training set of sliding windows provided at 704 (e.g., at the first end of the pipeline). The relevant metrics may be logged and one or more of the models (neural networks) may be saved at the end of the training time. This may also act as a checkpoint to resume work.

The method 700 may include evaluating the network against a test set, as at 710. After the training, the network may be evaluated against a test set of fixed size and content, and the individual results may be logged into separate files. This may permit examination of the results after the end of the training and/or implementation of the network. The content of this file, for example, may be used to assess the success of the network, e.g., using graphs of a goal metric (e.g., individual intersection over union (IoU) for the sliding windows in the test set and/or a mean IoU (mIoU) over all of the sliding windows in the test set) at given loops. If the goal metric(s) are sufficient, the method may halt at this stage and output a trained semantic segmentation model, which may be used for semantic segmentation application as disclosed herein.

The method 700 may also include sampling the images, as at 712 and 714, which may include ranking the sliding windows by computing the uncertainty metric, as at 712, and selecting a next subset of training sliding windows based on the ranking and based on a similarity metric, as at 714. In this phase, the uncertainty metric is computed, as at 712, and the results fed to the sampling function previously chosen by the user, as at 714. For example, sampling may proceed by avoiding sliding windows that are highly similar to other, already-selected sliding windows, thereby retaining a distribution that enhances performance. For example, the method 700 may select the next subset of sliding windows by clustering the sliding windows that have not yet been used for training based on a similarity metric. For each cluster, a similarity centroid may be computed to identify a most representative sliding window for each cluster. Then, for each centroid, a number of sliding windows that have the highest-ranked uncertainty per the uncertainty metric may be selected for inclusion in the next training subset of sliding windows.

Note that according to some embodiments, the similarity metric values for each sliding window may be computed up front, e.g., prior to the actions of 710-720. The centroids may be computed at or around the same time. Then the actions of 712 and 714 may be performed on the most representative sliding windows for each cluster, e.g., as determined by the centroid computations.

As a whole, the method 700 may be a priori metric-agnostic, and the user may choose the metric. Changing metrics (e.g., from similarity to something else) may result in a slight addition in the sampling function to adapt to the format of the results computed by the uncertainty metric.

For a certain number of images, e.g., five, that have the greatest result at the end of the uncertainty metric computation (and therefore that are the first ones to be sampled by the method 700), the method 700 saves a snapshot containing, for each image, the ground truth, the image, the prediction, and the heatmap produced by the computation of the metric, along with the mIoU for each image and its filename. If the option is checked, the method 700 may also include serializing detailed IoU reports (here under the form of dictionaries) for each class present in the image.

The method 700 may then include generating a next training file, which includes sampled images (and/or windows thereof), as at 716. At the end of the sampling phase for each iteration, the method 700 takes in account the images chosen and adds them to the previously selected images, in the form of a training file, like at 702. This stage also acts as another checkpoint for resuming work, should subsequent actions fail. The next actions include obtaining corresponding ground truth masks for inclusion in the training file, as shown and described herein in reference to FIGS. 8 and 9.

The method 700 may include retraining the semantic segmentation model, as at 720. The retraining process may be similar to the training process of 708, except that the newly labeled sliding windows may be used. After 720, control reverts to 710.

Labeling GUIs

The framework may provide a GUI, e.g., locally to the machine, or a plurality of collaborative GUIs, as at 716. The GUIs may highlight the sliding windows selected by the algorithm, on the full images, to the user, so that the labeling may be done using the full image as a context of the sliding window, rendering it more precise.

Figure 8:
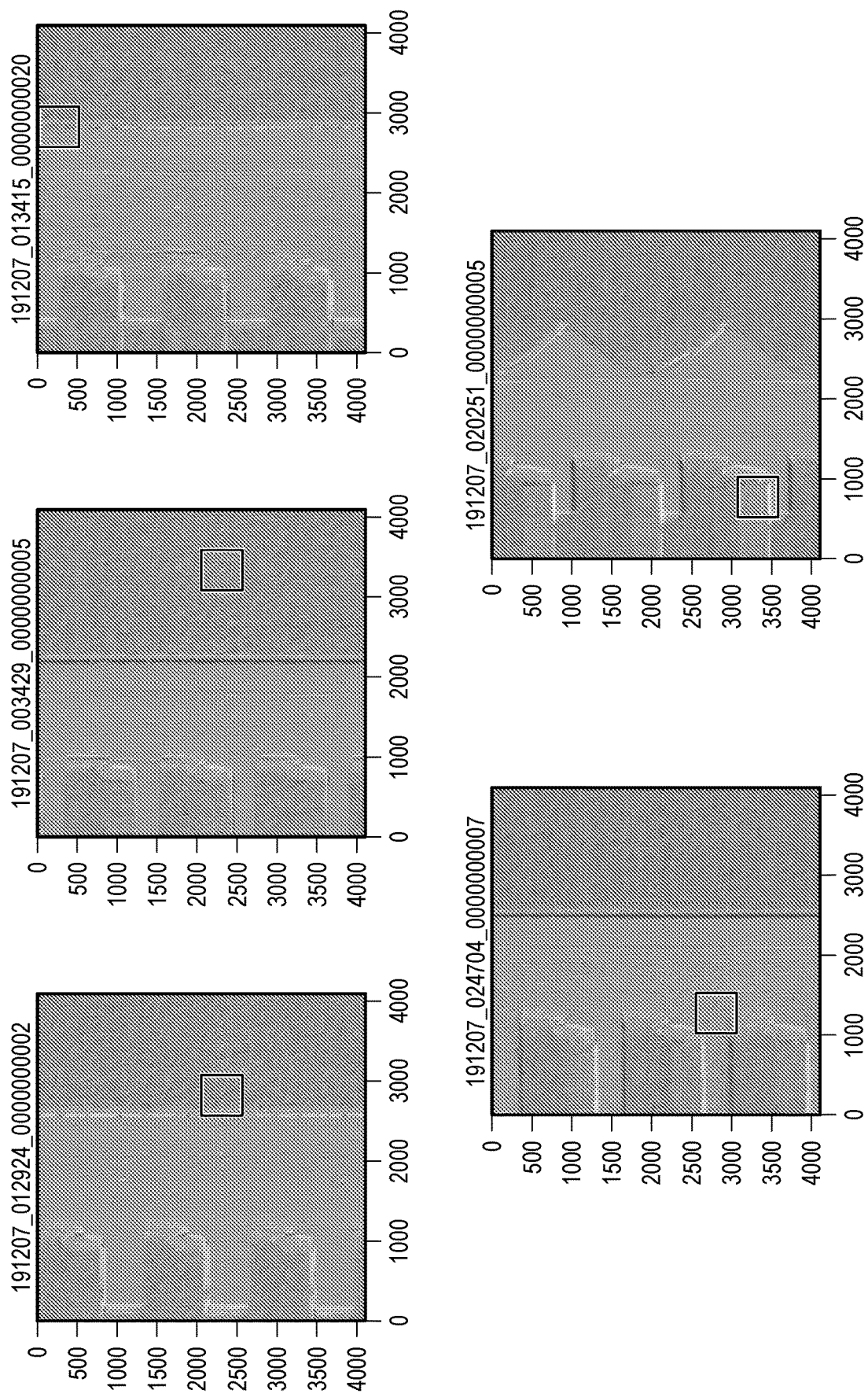
FIG. 8 illustrates an example of the sliding windows that may be displayed for labeling purposes.

FIG. 8 illustrates an example of the sliding windows that may be displayed for labeling purposes. In particular, the images of FIG. 8 may be displayed in a local or collaborative GUI. The sliding windows may be identified by displaying them circumscribed by their boundaries, as shown in FIG. 8. In the GUI, a user may provide ground-truth labeling in the sliding windows as they appear in the context of the greater image. Displaying the greater image is helpful because it provides greater context, resulting in more accurate labeling. To provide context, a user may label the sliding windows by identifying pixels in various semantic segments directly within the sliding windows that are shown within the greater images, or may label the sliding windows in different view that is displayed separately from, but on the same page as, the greater images. That is, the sliding windows may be shown in the context of the greater image of which they are part, but the user may label the sliding images either as shown within a greater image or in an expanded view displayed separately from the sliding window circumscribed within the greater image. For the latter case, the sliding window that is amenable to labeling may be displayed above, below, or adjacent to the depiction of the greater image that shows the sliding window in context. In either case, the user may zoom in, zoom out, pan, etc.

According to some embodiments, the GUI may automatically, or controllably, display the current segmentation results for the displayed image. That is, some embodiments can display the segmentation prediction of the network at the particular iteration on the sliding window. The display may be in the form of a mask and/or heatmap, for example. For example, the prediction on the whole image may be obtained from the model trained at the current iteration, and then for every sliding window sampled at the current iteration that appears in that image, the mask of the full image inside that sliding window boundary may be replaced with the prediction made by the network on the sliding window scale. The model at an iteration may be used to run prediction on all the sliding windows, and since each sliding window is associated with data indicating what image it comes from and where within this image it lies, it is possible to reconstitute a full image mask prediction that includes the whole image together with a sampled image prediction mask. Thus, the prediction may be overlayed on the original images they come from, with the prediction mask both from the whole image (run through the network) and the prediction contained within the sliding window from the image.

By displaying what the network has predicted on the selected sliding window in the context of the greater image (which also comes with its prediction) some embodiments showcase how the network prediction is doing on the local sliding window relative to the greater image. Such displaying allows the user to validate that the network picked the right data, with the expectation being that performance is unacceptable during iterations prior to the method 700 halting at 710.

If, on the one hand, performance is acceptable at this stage, then the user can reject that image from labeling set, e.g., using a GUI control, and the method 700 may replace it with a different image, e.g., the next image from the sorted/ranked images based on entropy/metrics. In this case, the prediction from the current iteration and the respective image may be incorporated into the next training set for training in the next iteration. This may reinforce the prediction as an acceptable labeled image set (for subsequent iterations). Thus, some iterations may include both human-labeled and machine-labeled images.

If, on the other hand, the user sees at this stage that the prediction is indeed unacceptable, then this provides confirmation that the metrics used for active learning are picking up properly the most uncertain images; otherwise, the user can reject the image for labeling and the method 700 may select the next most uncertain image to label from the queue. Showing the network prediction for the current iteration may be performed for all images selected so as to feed into the method 700 human curated information if the images picked are not the right ones, so that next iteration may minimize picking images that are false positives (wrongly uncertain).

The user may provide labels by using any of a variety of techniques. According to some embodiments, the user may paint various portions of the sliding windows using a virtual paintbrush, where different colors denote different semantic segmentations.

The labeled images may be incorporated into a training file for the current iteration using a specialized data structure. For example, the data structure may include input images split in sliding windows, where each image has a unique identifier with a unique labeling scheme such that every sliding window is stored with a file or unique name that indicates what full image it comes from and from which location within the image.

A multi-user labeling platform may be provided, e.g., as an expansion of the single user GUI described above. The GUIs may be configured to permit each user to choose the number of labelers, their usernames, the number of images to label each iteration, the metric to be applied, the sampling mode for the sliding windows, and the parameters closer to the hardware such as the number of GPUs, on which machine he wishes the experiment to run, and the parameters of the model such as the learning rate, the number of epochs, the batch size and the size of the images. Via the GUI, a user can also specify the number of images for the model to start training on. In case the data is simulated, the method 700 may randomly select the starting images among the unlabeled images of the dataset, and if the experiment involves labelers, then labeling jobs may be created for each labeler, as if it were images sampled after a loop.

For each sampling mode, once the sliding windows are sampled, labeling jobs may be created for the labelers. The labeler may be shown full images, highlighting parts to be labeled. For a given image, if more than a certain number of sliding windows are to be labeled within that image, the labeler may be asked to label the whole image, rather than or in addition to displaying individual windows. Additionally, if the labeler labels more than assigned, the algorithm may store in memory the labels that he provided and use them in the sampling stage. An example portion of a GUI is provided in FIG. 9.

Example Performance

FIGS. 10, 11, 12, 13, and 14 compare performance of various reductions to practice, including comparisons among the various sampling configurations.

Figure 10:
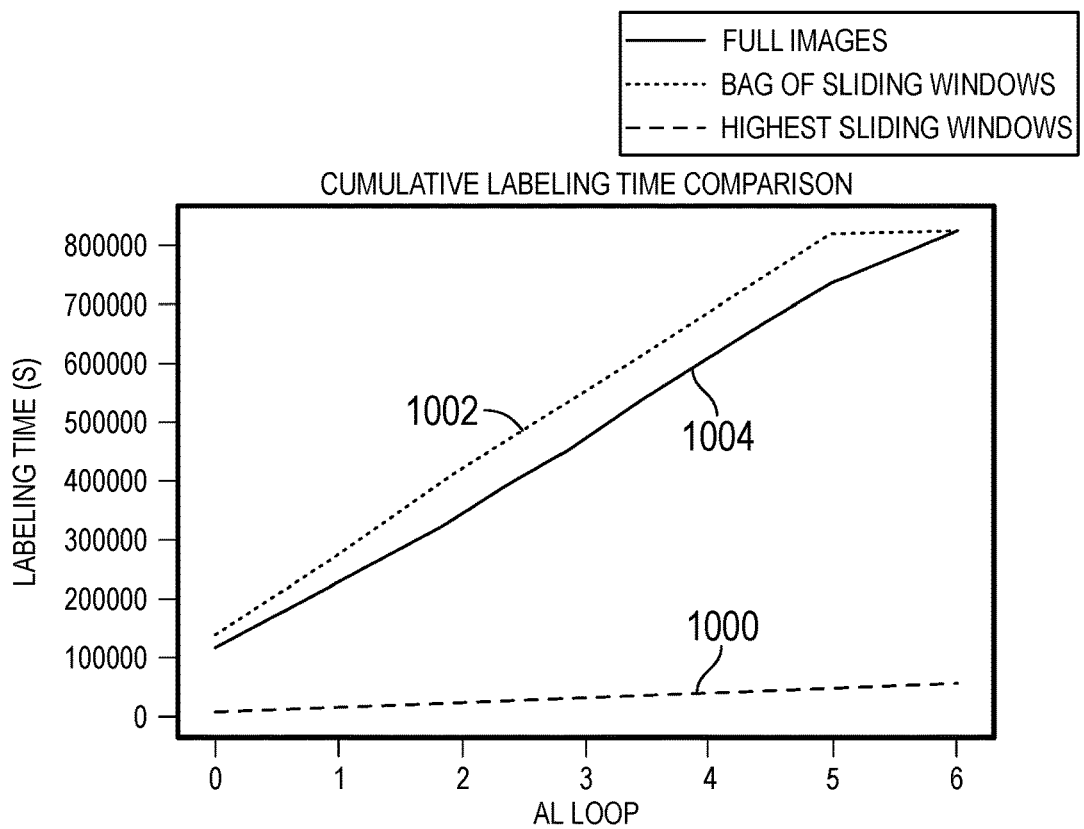
FIG. 10 illustrates a plot of cumulative labeling times for different sampling techniques, according to an embodiment.
Figure 11:
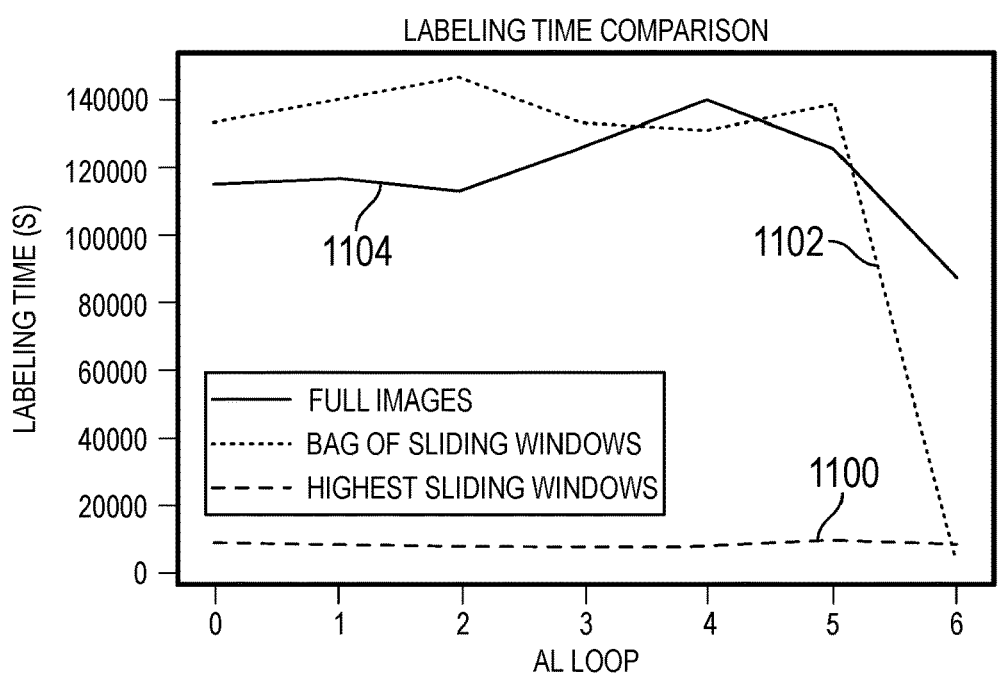
FIG. 11 illustrates a plot of labeling times for different sampling techniques, according to an embodiment.

FIGS. 10 and 11 show examples of performance gains in time achieved with an embodiment. The x-axes represent number of iterations, and the y-axes represent cumulative labelling time. The figures include plots 1000, 1100, respectively, of the highest sliding windows configuration described herein. The plots 1002, 1102 for the bag of sliding windows configuration also show a first level of improvement over the full image configuration 1004, 1104. FIG. 11 also shows a drop for the bag of sliding windows configuration because the dataset is 2032 images long, and the method may sample the same number of windows each time (which is not the case for the two other sampling modes), and therefore the last iteration of the method samples fewer images, implying a drop in the labeling time.

Figure 12:
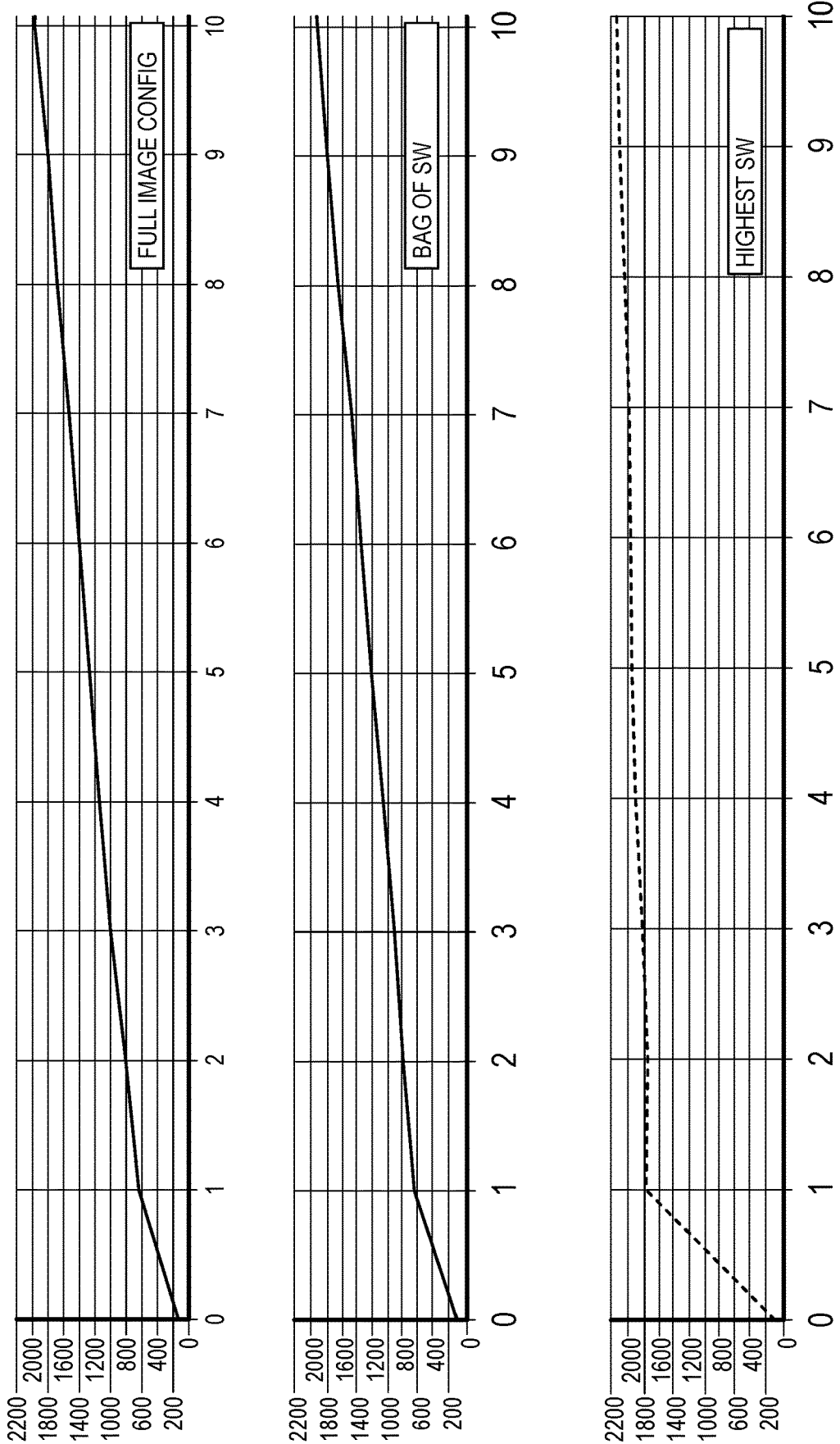
FIG. 12 illustrates plots of training times for different sampling techniques, according to an embodiment.

Similarly, FIG. 12 shows that the highest sliding windows sampling configuration outperformed the two other ones in a reduction to practice mostly because the dataset was redundant, and therefore a few images well describe the whole dataset. As in FIGS. 10 and 11, the x-axes represent number of iterations, and the y-axes represent cumulative labelling time.

Figure 13:
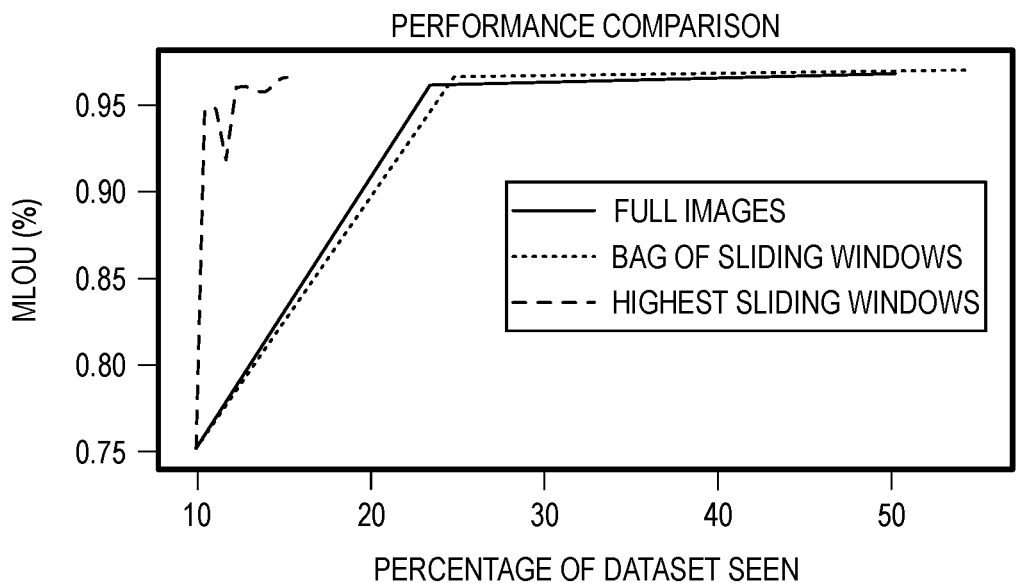
FIG. 13 illustrates a plot of performance per percentage of training dataset for different sampling configurations according to a goal metric.
Figure 14:
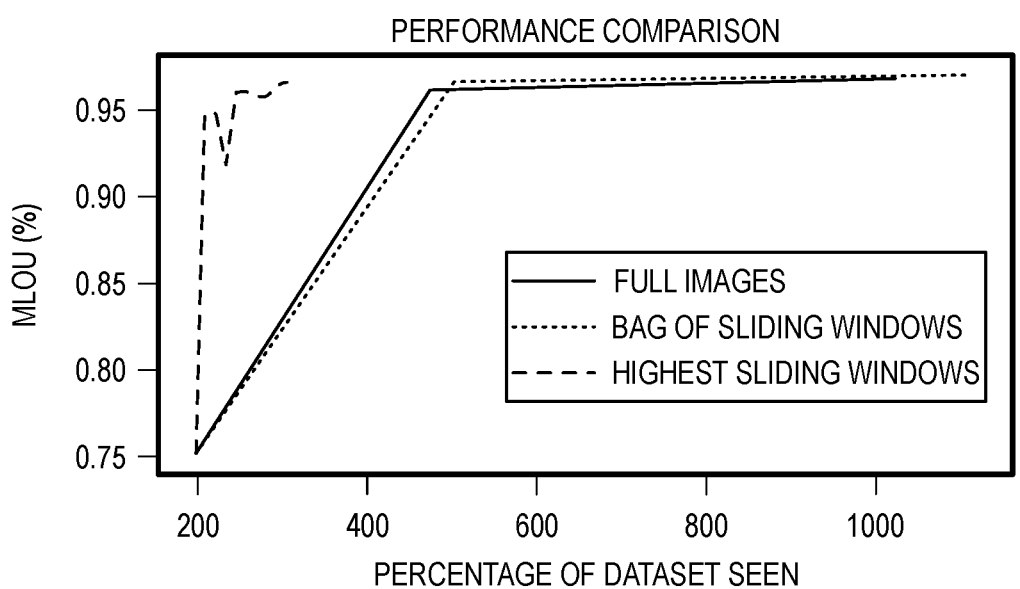
FIG. 14 illustrates a plot of performance per number of training images for different sampling configurations according to a goal metric.

FIGS. 13 and 14 illustrate plots of performance per training amount for different sampling configurations according to a goal metric. In particular, FIG. 13 illustrates a plot of performance per percentage of training dataset, and FIG. 14 illustrates a plot of performance per number of training images. As shown, the highest sliding windows configuration achieves the performance of the other configurations at about 12% of the training data, as compared to about 25% of the training data (FIG. 13), and after about 250 images, as compared to about 500 images (FIG. 14).

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Computing Environment

Figure 15:
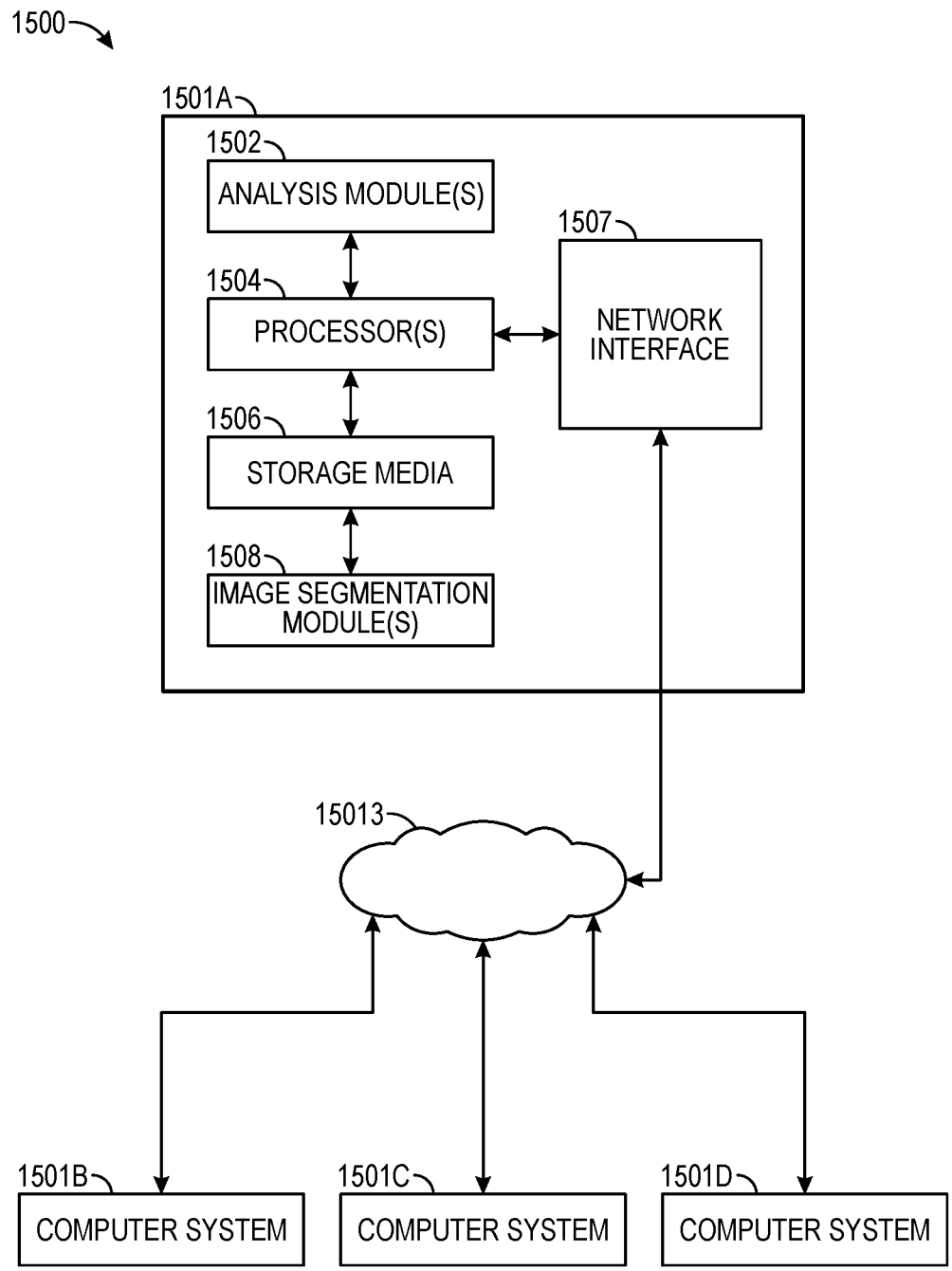
FIG. 15 illustrates a schematic view of a computing system, according to an embodiment.

In some embodiments, any of the methods of the present disclosure may be executed by a computing system. FIG. 15 illustrates an example of such a computing system 1500, in accordance with some embodiments. The computing system 1500 may include a computer or computer system 1501A, which may be an individual computer system 1501A or an arrangement of distributed computer systems. The computer system 1501A includes one or more analysis module(s) 1502 configured to perform various tasks according to some embodiments, such as one or more methods disclosed herein. To perform these various tasks, the analysis module 1502 executes independently, or in coordination with, one or more processors 1504, which is (or are) connected to one or more storage media 1506. The processor(s) 1504 is (or are) also connected to a network interface 1507 to allow the computer system 1501A to communicate over a data network 1509 with one or more additional computer systems and/or computing systems, such as 1501B, 1501C, and/or 1501D (note that computer systems 1501B, 1501C and/or 1501D may or may not share the same architecture as computer system 1501A, and may be located in different physical locations, e.g., computer systems 1501A and 1501B may be located in a processing facility, while in communication with one or more computer systems such as 1501C and/or 1501D that are located in one or more data centers, and/or located in varying countries on different continents).

A processor can include a microprocessor, microcontroller, processor module or subsystem, programmable integrated circuit, programmable gate array, or another control or computing device.

The storage media 1506 can be implemented as one or more computer-readable or machine-readable storage media. Note that while in the example embodiment of FIG.

15 storage media 1506 is depicted as within computer system 1501A, in some embodiments, storage media 1506 may be distributed within and/or across multiple internal and/or external enclosures of computing system 1501A and/or additional computing systems. Storage media 1506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1500 contains one or more image segmentation module(s) 1508. In the example of computing system 1500, computer system 1501A includes the image segmentation module 1508. In some embodiments, a single image segmentation module may be used to perform some or all aspects of one or more embodiments of the methods. In alternate embodiments, a plurality of image segmentation modules may be used to perform some or all aspects of methods.

It should be appreciated that computing system 1500 is only one example of a computing system, and that computing system 1500 may have more or fewer components than shown, may combine additional components not depicted in the example embodiment of FIG. 15, and/or computing system 1500 may have a different configuration or arrangement of the components depicted in FIG. 15. The various components shown in FIG. 15 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Semantic segmentation, geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1500, FIG. 15), and/or through manual control by a user who may make determinations regarding whether a given step, action, template, model, or set of curves has become sufficiently accurate for visual inspection of manufactured items and/or evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of adaptive learning for semantic segmentation of images, the method comprising:
    obtaining a semantic segmentation model, the semantic segmentation model having been trained using a first subset of sliding windows and corresponding first ground truth masks for the first subset of sliding windows;
    ranking a plurality of sliding windows from a corpus of training images according to an uncertainty metric;
    selecting a next subset of sliding windows from the corpus of training images based on the ranking and based on a similarity metric for one or more characteristics of a sliding window relative to other sliding windows;
    providing a collaborative user interface for labeling the next subset of sliding windows;
    receiving ground truth masks for the next subset of sliding windows using the collaborative user interface; and
    retraining the semantic segmentation model using the next subset of sliding windows and the ground truth masks for the next subset of sliding windows.

2. The method of claim 1, wherein the corpus of training images represents a cutter of a drill bit.

3. The method of claim 2, further comprising determining an integrity of the cutter of the drill bit using the semantic segmentation model.

4. The method of claim 1, further comprising repeating the ranking, the selecting, the providing, the receiving, and the retraining a plurality of times.

5. The method of claim 1, wherein the obtaining the semantic segmentation model comprises training the semantic segmentation model using the first subset of sliding windows and the corresponding first ground truth masks for the first subset of sliding windows.

6. The method of claim 1, wherein the collaborative user interface for labeling the next subset of sliding windows displays a respective sliding window from the next subset of sliding windows in a context of a full training image from the corpus of training images.

7. The method of claim 6, wherein the collaborative user interface for labeling the next subset of sliding windows displays a respective sliding window from the next subset of sliding windows highlighted within a full training image from the corpus of training images.

8. The method of claim 6, wherein the collaborative user interface for labeling the next subset of sliding windows displays a respective heatmap generated by the semantic segmentation model over a respective sliding window from the next subset of sliding windows.

9. The method of claim 1, wherein the uncertainty metric comprises an entropy metric.

10. The method of claim 1, wherein the selecting the next subset of sliding windows comprises:
grouping the plurality of sliding windows based on the similarity metric into a plurality of clusters; and
selecting highest ranked sliding windows from each of the plurality of clusters.

11. A system for adaptive learning for semantic segmentation of images, the system comprising an electronic processor and a non-transitory computer readable medium comprising instructions that, when executed by the electronic processor, configure the electronic processor to perform actions comprising:
obtaining a semantic segmentation model, the semantic segmentation model having been trained using a first subset of sliding windows and corresponding first ground truth masks for the first subset of sliding windows;
ranking a plurality of sliding windows from a corpus of training images according to an uncertainty metric;
selecting a next subset of sliding windows from the corpus of training images based on the ranking and based on a similarity metric for one or more characteristics of a sliding window relative to other sliding windows;
providing a collaborative user interface for labeling the next subset of sliding windows;
receiving ground truth masks for the next subset of sliding windows using the collaborative user interface; and
retraining the semantic segmentation model using the next subset of sliding windows and the ground truth masks for the next subset of sliding windows.

12. The system of claim 11, wherein the corpus of training images represents a cutter of a drill bit.

13. The system of claim 12, wherein the actions further comprise determining an integrity of the cutter of the drill bit using the semantic segmentation model.

14. The system of claim 11, wherein the actions further comprise repeating the ranking, the selecting, the providing, the receiving, and the retraining a plurality of times.

15. The system of claim 11, wherein the obtaining the semantic segmentation model comprises training the semantic segmentation model using the first subset of sliding windows and the corresponding first ground truth masks for the first subset of sliding windows.

16. The system of claim 11, wherein the collaborative user interface for labeling the next subset of sliding windows displays a respective sliding window from the next subset of sliding windows in a context of a full training image from the corpus of training images.

17. The system of claim 16, wherein the collaborative user interface for labeling the next subset of sliding windows displays a respective sliding window from the next subset of sliding windows highlighted within a full training image from the corpus of training images.

18. The system of claim 16, wherein the collaborative user interface for labeling the next subset of sliding windows displays a respective heatmap generated by the semantic segmentation model over a respective sliding window from the next subset of sliding windows.

19. The system of claim 11, wherein the uncertainty metric comprises an entropy metric.

20. The system of claim 11, wherein the selecting the next subset of sliding windows comprises:
grouping the plurality of sliding windows based on the similarity metric into a plurality of clusters; and
selecting highest ranked sliding windows from each of the plurality of clusters.

* * * * *